US008520106B2

(12) United States Patent
Mashiyama et al.

(10) Patent No.: US 8,520,106 B2
(45) Date of Patent: Aug. 27, 2013

(54) SOLID-STATE IMAGING DEVICE WITH IMPROVED DYNAMIC RANGE

(75) Inventors: Hiroshi Mashiyama, Yokohama (JP); Satoshi Akabane, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 555 days.

(21) Appl. No.: 12/792,241

(22) Filed: Jun. 2, 2010

(65) Prior Publication Data
US 2010/0309352 A1 Dec. 9, 2010

(30) Foreign Application Priority Data
Jun. 3, 2009 (JP) ................................ 2009-134268

(51) Int. Cl.
*H04N 3/14* (2006.01)
*H04N 5/335* (2011.01)

(52) U.S. Cl.
USPC ............................ 348/294; 348/324; 348/299

(58) Field of Classification Search
USPC ................... 348/294, 299, 324; 235/461
See application file for complete search history.

(56) References Cited

U.S. PATENT DOCUMENTS

| | | | | |
|---|---|---|---|---|
| 5,272,544 A | * | 12/1993 | Sakai et al. | 358/445 |
| 7,202,463 B1 | * | 4/2007 | Cox | 250/214 R |
| 2004/0118994 A1 | * | 6/2004 | Mizuno | 250/214 R |
| 2007/0222879 A1 | * | 9/2007 | Glenn et al. | 348/297 |
| 2008/0001065 A1 | * | 1/2008 | Ackland | 250/208.1 |
| 2008/0106622 A1 | * | 5/2008 | Turchetta et al. | 348/294 |
| 2010/0079616 A1 | * | 4/2010 | Minakuti et al. | 348/229.1 |
| 2010/0264296 A1 | * | 10/2010 | Ackland | 250/208.1 |

FOREIGN PATENT DOCUMENTS

| | | |
|---|---|---|
| JP | 3-20708 A | 1/1991 |
| JP | 7-274072 A | 10/1995 |
| JP | 2002-152607 A | 5/2002 |
| JP | 2007-288805 | 11/2007 |
| JP | 2008-17176 A | 1/2008 |

OTHER PUBLICATIONS

Japanese Office Action issued Nov. 20, 2012 in Patent Application No. 2009-134268 with English Translation.

* cited by examiner

*Primary Examiner* — Roberto Velez
*Assistant Examiner* — Cynthia Segura
(74) *Attorney, Agent, or Firm* — Oblon, Spivak, McClelland, Maier & Neustadt, L.L.P.

(57) ABSTRACT

According to one embodiment, a solid-state imaging device includes a photoelectric conversion section, first circuit, second circuit, and third circuit. The photoelectric conversion section generates signal charge corresponding to the intensity of the irradiation light. The first circuit reads the signal charge generated by the photoelectric conversion section. The second circuit detects that the signal charge in the photoelectric conversion section has overflowed. The third circuit produces a signal corresponding to the time elapsed from the start of generation of the signal charge in the photoelectric conversion section, and holds and reads the signal at a timing at which the overflow has been detected by the second circuit.

12 Claims, 8 Drawing Sheets

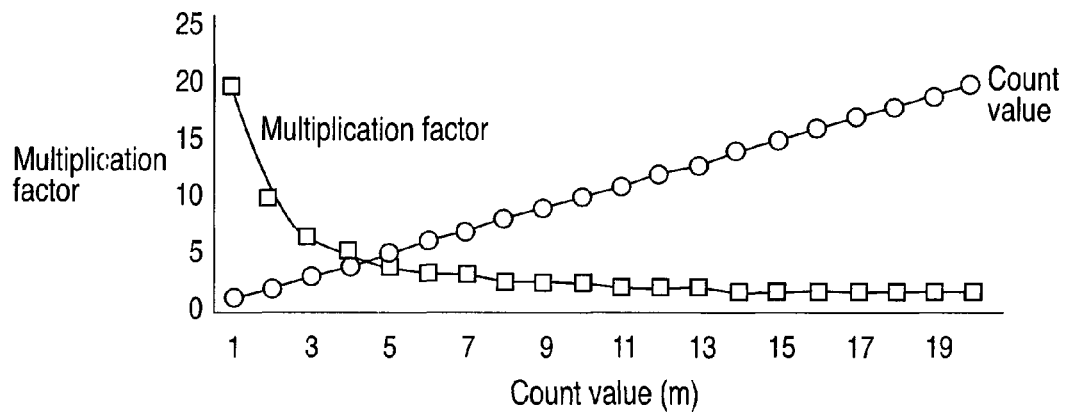
F I G. 2A
| Count value m | Multiplication factor |
|---|---|
| 1 | 20.00 |
| 2 | 10.00 |
| 3 | 6.67 |
| 4 | 5.00 |
| 5 | 4.00 |
| 6 | 3.33 |
| 7 | 2.86 |
| 8 | 2.50 |
| 9 | 2.22 |
| 10 | 2.00 |
| 11 | 1.82 |
| 12 | 1.67 |
| 13 | 1.54 |
| 14 | 1.43 |
| 15 | 1.33 |
| 16 | 1.25 |
| 17 | 1.18 |
| 18 | 1.11 |
| 19 | 1.05 |
| 20 | 1.00 |
F I G. 2B

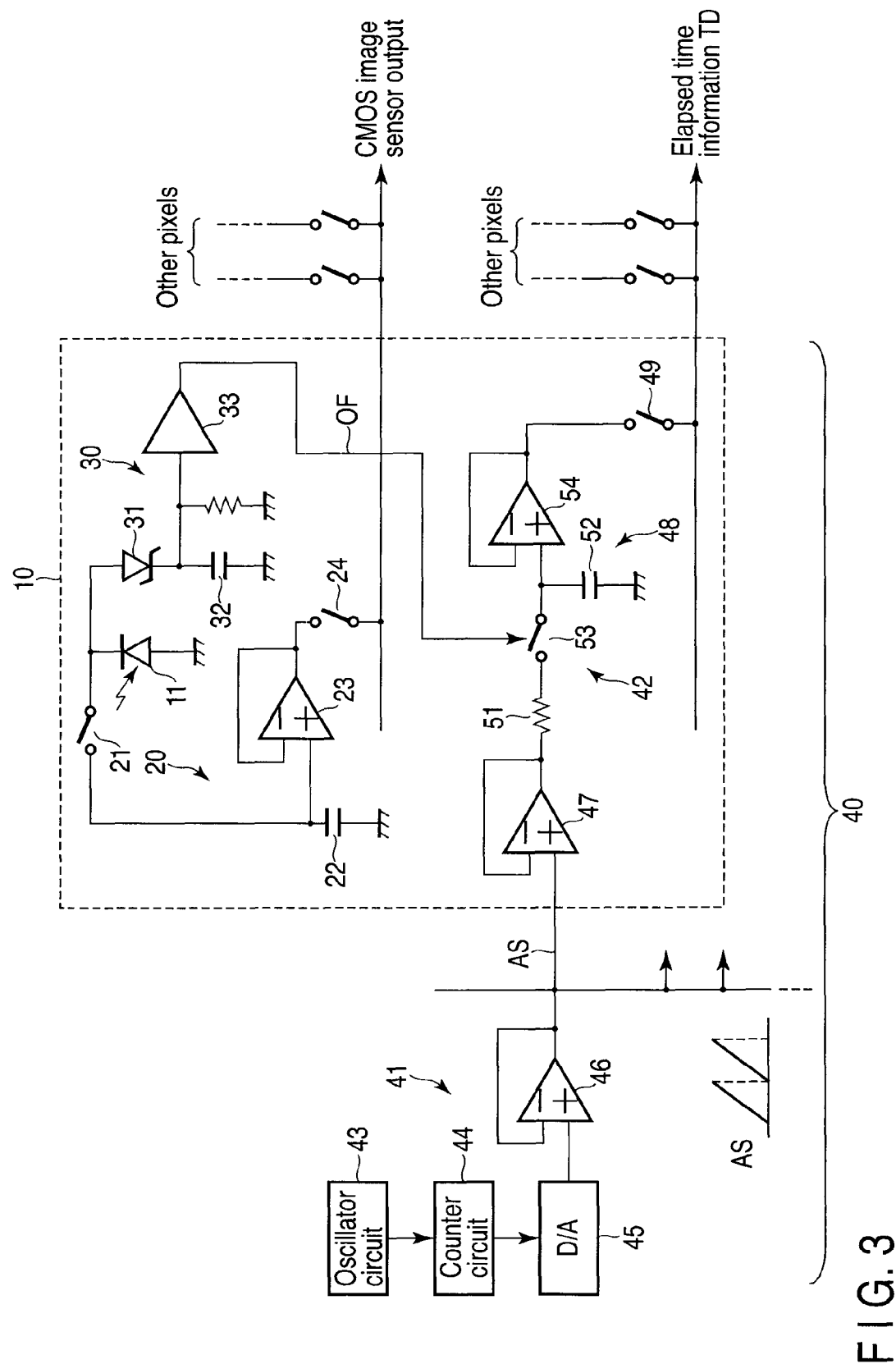
F I G. 3

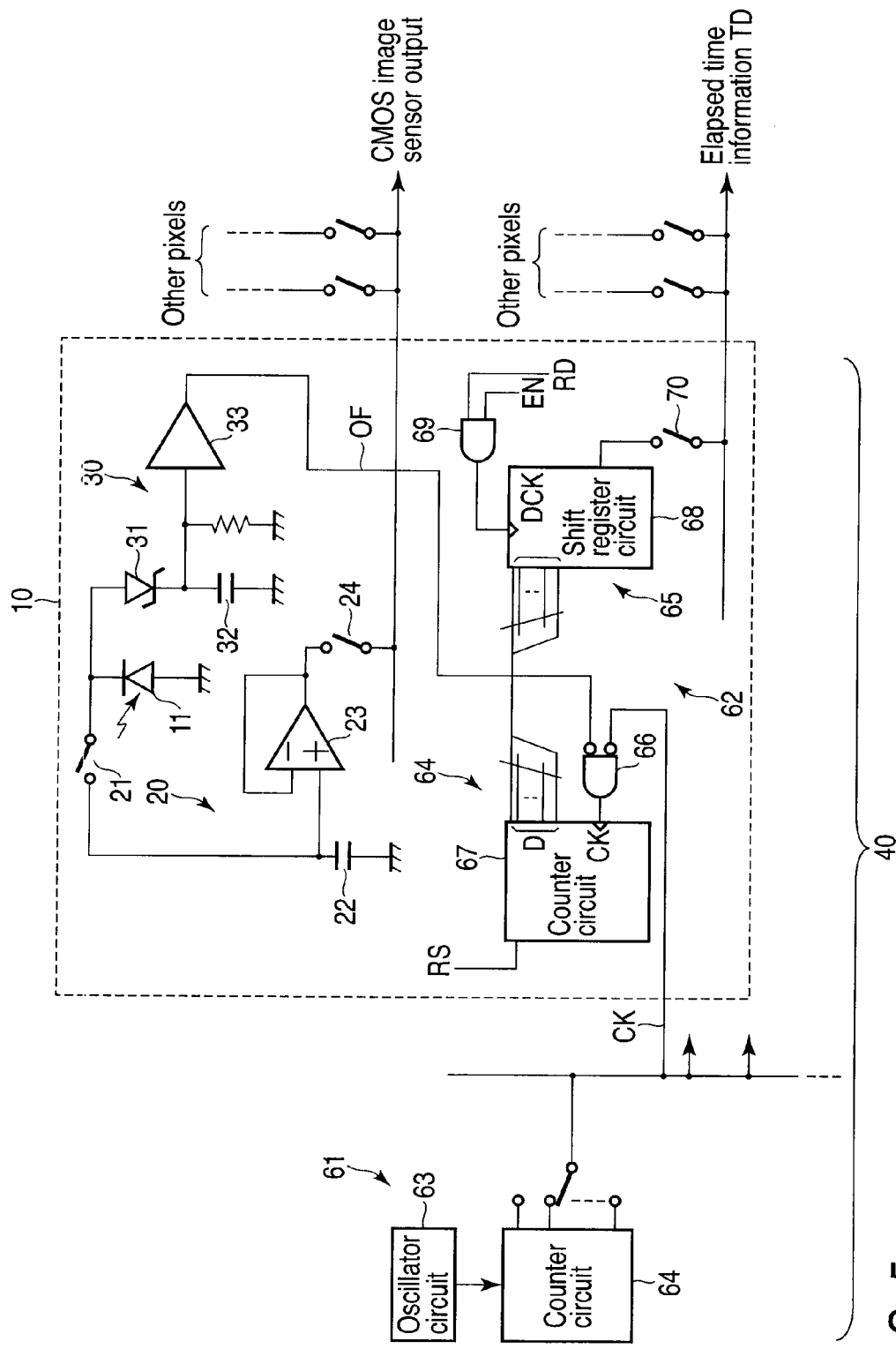
F I G. 5

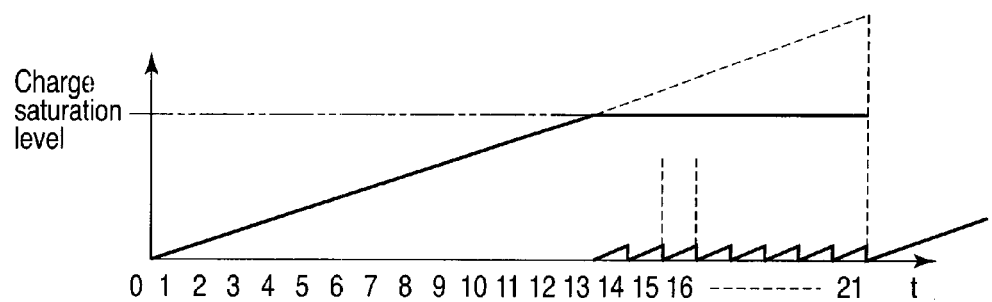
F I G. 8A
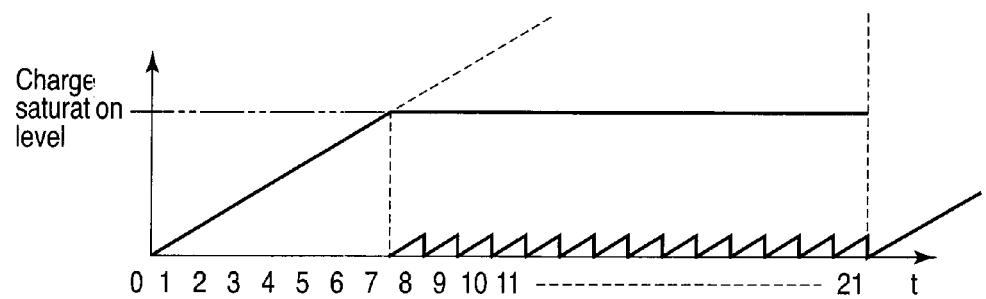
F I G. 8B
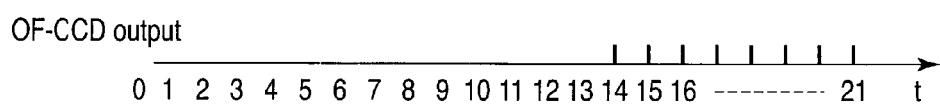
F I G. 8C
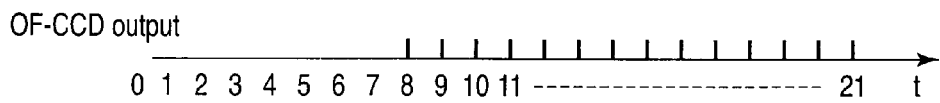
F I G. 8D

SOLID-STATE IMAGING DEVICE WITH IMPROVED DYNAMIC RANGE

CROSS-REFERENCE TO RELATED APPLICATIONS

This application is based upon and claims the benefit of priority from Japanese Patent Application No. 2009-134268, filed Jun. 3, 2009; the entire contents of which are incorporated herein by reference.

FIELD

Embodiments described herein relates generally to a solid-state imaging device using an image pickup device such as a CCD image sensor, CMOS image sensor or the like configured to convert an optical signal into an electrical signal, and electrically read an image projected on an imaging surface.

BACKGROUND

In a solid-state imaging device such as a CCD image sensor, CMOS image sensor or the like, electric charge proportional to the amount of received light is produced by photoelectric conversion by means of image pickup devices (photodiodes) in a plurality of pixels arranged on the imaging surface, and signal charge for each pixel is read, whereby an image on the light receiving surface is reproduced as an electrical signal.

In a photodiode, signal charge generated in proportion to the amount of light is read. Accordingly, the drawback that the dynamic range of the light intensity signal is narrow is theoretically exists. That is, although the signal charge increases linearly in proportion to the amount of light, there is a limit to the charge that can be accumulated in the photodiode of the photoelectric conversion section. By the limit of the accumulated charge, the maximum value of the dynamic range of the received image is determined. Further, when the signal charge is read in arbitrary resolution, the least significant bit (LSB) of the resolution determines the minimum value of the dynamic range. Furthermore, in the photodiode, generally a dark current exists. It is a general matter that due to variations in dark current between pixels, and temperature characteristics, information at the darkest time cannot be read by the accuracy up to 1 LSB which is the minimum sensitivity.

The problem of such saturation of charge or minimum sensitivity limit appears as a whitened or blackened image. The image information of a whitened part resulting from saturation has only information on saturated white, and details such as the gradation information on the brightness, in the case of the color, intensity ratios of adjacent pixels of three colors, that is, information on the color tone, and the like are lost. Further, in an image taken in color, when image information on each of one or two colors of adjacent three primary colors is saturated, and pixels of the remaining color or colors are not saturated, a color different from the actual color is represented. Further, the problem of the minimum sensitivity limit appears as a fact that information on the pixel of a certain noise level or lower is equally 0, i.e., as a blackened image. The image information of a blackened part has no information on the degree of darkness, and has only information indicating an equally black state of the level 0, and hence the details are lost.

The ordinary countermeasures against such a whitened image and blackened image lead to conflicting results. That is, in a certain image, when the aperture is reduced or the exposure time is shortened in order to prevent the whitening, a dark part becomes likely to be blackened further. Conversely, when the stop is opened or the exposure time is made longer in order to prevent the blackening, a light part becomes likely to be whitened further.

Such a phenomenon (drawback) is a point largely inferior to the film photography, and is a general phenomenon in imaging equipments utilizing the CCD image sensor or CMOS image sensor. In order to solve such a problem, and enlarge the dynamic range of the limited signal output, various methods have been proposed up to now.

Some measures presently advocated in order to enlarge the dynamic range of such signal output will be shown below.

(1) Dual sampling: Sampling is carried out two times by using different accumulation time lengths. Two images are combined, and an image with a wide dynamic range is obtained. This system essentially includes the problem of the simultaneity of signals, this becoming the weak point in imaging of a moving object. As a specific example to which dual sampling is applied, for example, a technique disclosed in Jpn. Pat. Appln. KOKAI Publication No. 2007-288805 is known.

(2) Logarithmic conversion: Logarithmic conversion is carried out in the pixels by utilizing the fact that the drain current, and gate-source voltage exhibit logarithmic characteristics. In this system, there are problems of the responsiveness of a case where the optical signal is small, and exponential extension (the low level is exponentially enlarged, and hence fixed-pattern noise due to variations in dark level is enlarged) of a dark-time offset.

(3) Accumulation capacity modulation system: A system in which the Floating Diffusion (FD) capacity configured to accumulate signal charge in accordance with the intensity of the optical signal is modulated. In this system, the upper limit range of the dynamic range is physically determined by the upper limit of the capacitance value which is imparted to the FD capacity.

(4) In-pixel A/D converter and multiple sampling: A system in which an A/D conversion function is provided in the pixels, and resolution is changed according to the signal level by changing the accumulation time. In this system, there is a problem that a large number of elements must be arranged in the pixels.

(5) In-pixel analog processing system: The dual sampling system is carried out in the pixels by analog calculation. This system essentially includes, like the system of (1), the problem of the simultaneity of signals, this becoming the weak point in imaging of a moving object.

As described above, in the ordinary solid-state image device, the dynamic range is limited and, as a result of this, there is the problem that whitening or blackening occurs in the obtained image. Further, although in order to cope with such circumstances, several countermeasures are taken, each case has an advantage, and also has a drawback.

BRIEF DESCRIPTION OF THE DRAWINGS

FIG. 2A and FIG. 2B are views showing a relationship between the count value of a case where the signal output of the pixel is saturated and the multiplication factor to be arithmetic-processed in the solid-state imaging device according to each of the various embodiments;

FIG. 3 is a circuit diagram showing the configuration of a CMOS image sensor according to a first embodiment;

FIG. 5 is a circuit diagram showing the configuration of a CMOS image sensor according to a third embodiment;

FIG. 8A, FIG. 8B, FIG. 8C and FIG. 8D are waveform charts showing example of the operation of the CCD image sensor of FIG. 7A.

DETAILED DESCRIPTION

In general, according to one embodiment, a solid-state imaging device includes a photoelectric conversion section, first circuit, second circuit, and third circuit. The photoelectric conversion section generates signal charge corresponding to the intensity of the irradiation light. The first circuit reads the signal charge generated by the photoelectric conversion section. The second circuit detects that the signal charge in the photoelectric conversion section has overflowed. The third circuit produces a signal corresponding to the time elapsed from the start of generation of the signal charge in the photoelectric conversion section, and holds and reads the signal at a timing at which the overflow has been detected by the second circuit.

Next, the principle of embodiments will be described below before the description of the various embodiments.

Figure 1A:
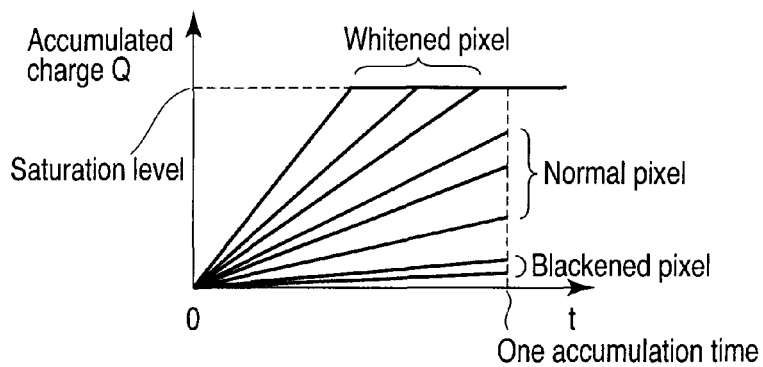
FIG. 1A and FIG. 1B are characteristic views for explaining the principle of a solid-state imaging device according to each of various embodiments.

FIG. 1A shows a relationship between the signal charge accumulation time t of the photodiode in the pixel of the solid-state imaging device, and accumulated charge Q. When the accumulated charge reaches the saturation level within one accumulation time which is a unit conversion period, the photodiode cannot accumulate the signal charge any more, thus so-called whitening occurs, and the pixel becomes a whitened pixel. On the other hand, when the accumulated charge is at a low level within the one accumulation time, so-called blackening occurs, and the pixel becomes a blackened pixel. A pixel existing between the whitened pixel and blackened pixel is a normal pixel.

In the solid-state imaging device according to each of the various embodiments, in the case where saturation of the signal charge has not occurred in the photodiode when an image is taken, there is no any difference between the solid-state imaging device according to the embodiment and ordinary solid-state image device, and the signal charge photoelectrically converted by the photodiode is read as it is.

As shown in FIG. 1A, when saturation of the accumulated charge has occurred, it is not possible to determine at what amount of light the saturation has occurred even by comparing the saturated signal charges of the photodiodes. Thus, in the solid-state imaging device of each of the various embodiments, in order to distinguish the degree of saturation, the elapsed time is measured within one accumulation time, the measurement of the elapsed time is stopped at a timing at which saturation has occurred, elapsed time information corresponding to the elapsed time is read, and the elapsed time information is used to calculate at what amount of light the saturation has occurred. It should be noted that the elapsed time information may be an analog signal or digital signal.

For example, when saturation occurs within an elapsed time of half one accumulation time, the actual amount of light is twice the signal obtained by the pixel. Alternatively, when saturation occurs within an elapsed time of one one-hundredth of one accumulation time, the actual amount of light is one hundred times the signal obtained by the pixel. In general, when saturation occurs within an elapsed time of one-Xth of one accumulation time, the actual amount of light is X times the saturation light amount signal obtained by the pixel.

Figure 1B:
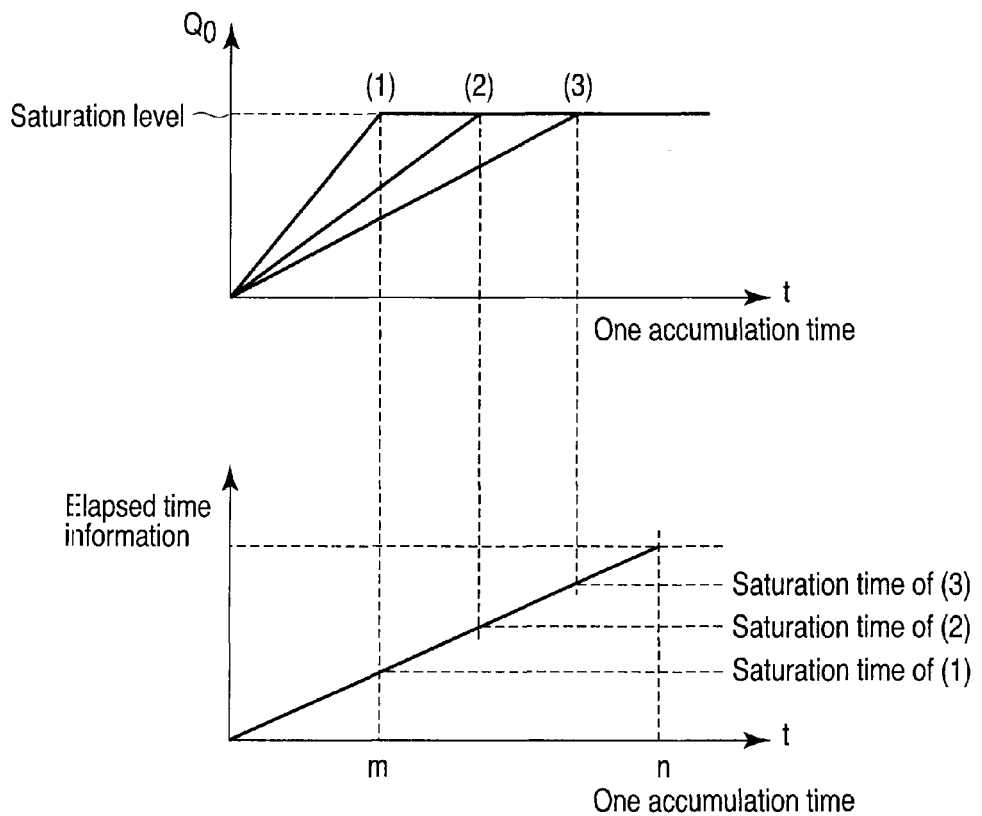

FIG. 1B shows a relationship between one accumulation time t and output Q0 of the photodiode in the upper column, and relationship between one accumulation time t and elapsed time information in the lower column. As shown in the upper column, the time required to reach the saturation level becomes longer in the order of the signals (1), (2), and (3). Here, attention is paid to the photodiode outputting the signal of, for example, (1), one accumulation time is defined as n considering that an elapsed time within one accumulation time is given by a counter of the maximum value n. The signal of (1) is saturated when the count value is m (m<n), and hence it can be seen that an output Q0 which can originally be obtained by the photodiode of the signal (1) is a value to be acquired by multiplying the saturation level by n/m.

That is, the actual light intensity I is given by the following formula (1).

$$I = I0 * n/m \quad (1)$$

Where I0 is the light intensity obtained from the saturation value detected by the photodiode.

FIG. 2A and FIG. 2B show, for example, when the elapsed time information is measured as a digital signal by using a counter, an example of a change in the value (multiplication factor) used to multiply the saturation value of the pixel when the maximum value of the counter is set at 20 (n=20), and the count value m has changed, and a result of calculation of the multiplication factor. For example, when the count value m is 10, it is possible to obtain a signal charge corresponding to the actual light intensity applied to the pixel by multiplying the saturation value of the signal charge read from the pixel by the multiplication factor of 2.00.

Next, various embodiments will be described below.

First Embodiment

FIG. 3 is a circuit diagram of a case where the solid-state imaging device is implemented in a CMOS image sensor. The CMOS image sensor of this embodiment includes a pixel array in which a plurality of pixels are arranged, and control circuit, and FIG. 3 shows the configuration of one pixel in the pixel array, and part of the control circuit. In the pixel 10, a photodiode 11 which is a photoelectric conversion section configured to generate signal charge according to the intensity of the irradiation light is provided. The signal charge photoelectrically converted by the photodiode 11 is converted into a voltage signal by a signal read section 20, and is read as a CMOS image sensor output. The signal read section 20 is constituted of a switch element 21 connected to the photodiode 11, capacitor 22 configured to convert the signal charge supplied thereto through the switch element 21 into a voltage signal, amplifier 23 configured to amplify the voltage signal converted by the capacitor 22, and switch element 24 connected to the amplifier 23.

There is a limitation in the element area of the photodiode 11, and hence when the photodiode is irradiated with light of high intensity, the signal charge generated in the photodiode 11 overflows in some cases. The charge overflowing the photodiode 11 is detected by an overflow detection section 30. The overflow detection section 30 is constituted of a Zener diode 31, capacitor 32, high-gain amplifier 33, and the like. When the charge overflows the photodiode 11, the charge is accumulated in the capacitor 32 through the Zener diode 31, is converted into a voltage signal, and is amplified by the amplifier 33, whereby an overflow flag OF is output.

In the CMOS image sensor of FIG. 3, an elapsed time information read section 40 is provided as means for measuring the elapsed time within one accumulation time of the photodiode 11. The elapsed time information read section 40 is configured to produce information corresponding to the elapsed time from the start of generation of the signal charge in the photodiode 11, and read the above-mentioned information at the time at which an overflow flag OF is output from the overflow detection section 30 and, in this embodiment, the section 40 is constituted of an analog signal output circuit 41 provided outside the pixel 10, and analog signal hold and read circuit 42 provided inside the pixel 10.

The analog signal output circuit 41 is configured to output an analog signal AS changing in a ramp function-form within one accumulation time of the photodiode 11, and is constituted of, for example, an oscillator circuit 43 configured to output a pulse signal of a constant period, counter circuit 44 configured to count a pulse signal output from the oscillator circuit 43, and output a digital signal, D/A converter 45 configured to subject a digital signal output from the counter circuit 44 to D/A conversion, and output an analog signal changing in a ramp function-form, and amplifier 46 configured to amplify an output of the D/A converter 45, and supply the amplified signal to a plurality of pixels 10.

The analog signal hold and read circuit 42 is configured to hold an analog signal AS at the time at which an overflow flag OF is output from the overflow detection section 30, and read the analog signal as elapsed time information TD, and is constituted of an amplifier 47 configured to amplify the analog signal AS output from the analog signal output circuit 41, sample-and-hold circuit (analog signal hold circuit) 48 configured to sample and hold an output of the amplifier 47 on the basis of the overflow flag OF, and switch element 49 configured to read an output of the sample-and-hold circuit 48 as elapsed time information TD. The sample-and-hold circuit 48 is constituted of a charging circuit constituted of, for example, a resistor 51 and capacitor 52, and configured to accumulate the output of the amplifier 47 with a certain time constant, switch element 53 interposed between the resistor 51 and capacitor 52, and conduction-controlled on the basis of the overflow flag OF, amplifier 54 configured to amplify the voltage accumulated by the charging circuit, and the like.

That is, in the CMOS image sensor of this embodiment, for example, an analog signal changing in a ramp function-form is used as a signal configured to measure the elapsed time within one accumulation time. However, the analog signal is not limited to the signal changing in a ramp function-shape. The frequency and the like of the oscillator circuit 43 are appropriately selected in such a manner that the value of the analog signal becomes the expected maximum value at the end of the one accumulation time. Further, the CMOS image sensor of FIG. 3 is based on the premise that the image sensor is operated by global exposure (exposure in which all the pixels carry out accumulation operation in the same period) achieved by electronic shutter drive.

In the CMOS image sensor of FIG. 3, when an output of a certain pixel (photodiode 11) is saturated, the photodiode is filled with the photoelectrically converted signal charge, and overflow is caused. The overflowing charge leaks into an adjacent pixel, and adversely affects the pixel in some cases, and hence is normally thrown into the substrate of the sensor to be disposed. In this embodiment, the charge overflowing the photodiode 11 is accumulated in a small capacitor 32 in the overflow detection section 30 to be converted into a voltage, is amplified by the high-gain amplifier 33, and is utilized as an overflow flag OF indicating saturation.

When the overflow flag OF is set, the analog signal AS changing in a ramp function-form is held by the sample-and-hold circuit 48. That is, when the overflow flag OF is set, the switch element 53 in the sample-and-hold circuit 48 is opened, and the charging operation of the charging circuit is stopped. When no overflow flag OF is set, a hold signal is asserted at the end of the one accumulation time, and the sample-and-hold circuit 48 is made to sample the last value of the ramp function-formed analog signal. It should be noted that it is assumed that the sample-and-hold circuit 48 can enter the sample mode without fail at the beginning of the one accumulation time.

In the CMOS image sensor, by virtue of the read mechanism thereof, it is possible to read the analog signal (elapsed time information TD) held in the sample-and-hold circuit 48 like a pixel signal. That is, it is sufficient if the elapsed time information TD is read by conduction-controlling the switch element 49 on the basis of an output of a vertical/horizontal scanning circuit configured to control/determine which of the pixel signals should be read like in the case of the read of the CMOS sensor to be carried out by the signal read section 20.

It is possible to obtain the signal charge corresponding to the actual light intensity applied to the pixels by carrying out calculation of multiplying the saturation value of the signal charge read from each pixel by a multiplication factor based on the elapsed time information TD as described in connection with FIG. 1 and FIG. 2 by using the elapsed time information TD read from each pixel in the manner described above. As a result of this, in the CMOS image sensor of this embodiment, it is possible to widen the dynamic range. Furthermore, this can be realized by addition of a simple circuit.

It should be noted that the CMOS image sensor of this embodiment is based on the premise that the image sensor is operated by global exposure achieved by electronic shutter drive. However, in the case of line exposure, the accumulation timing of the signal charge is deviated for each horizontal line. As a result of this, it is necessary to correct the elapsed time information TD held in the sample-and-hold circuit 48 for each line by an amount corresponding to the deviation in the timing. Alternatively, it is necessary to input a ramp-like waveform shifted a little in timing for each line. In this case, it is sufficient if analog signals for time measurement of a number corresponding to the number of horizontal lines are generated.

Further, in the CMOS image sensor of this embodiment, the overflow detection section 30 detects an overflow by amplifying the voltage signal converted by the capacitor 32 by means of the high-gain amplifier 33. However, the overflow flag may be set by detecting that the voltage signal converted by the capacitor 32 has reached a certain threshold level. This method can be applied to a CMOS image sensor in which the charge is converted into a voltage to be read in the pixel.

Second Embodiment

Figure 4:
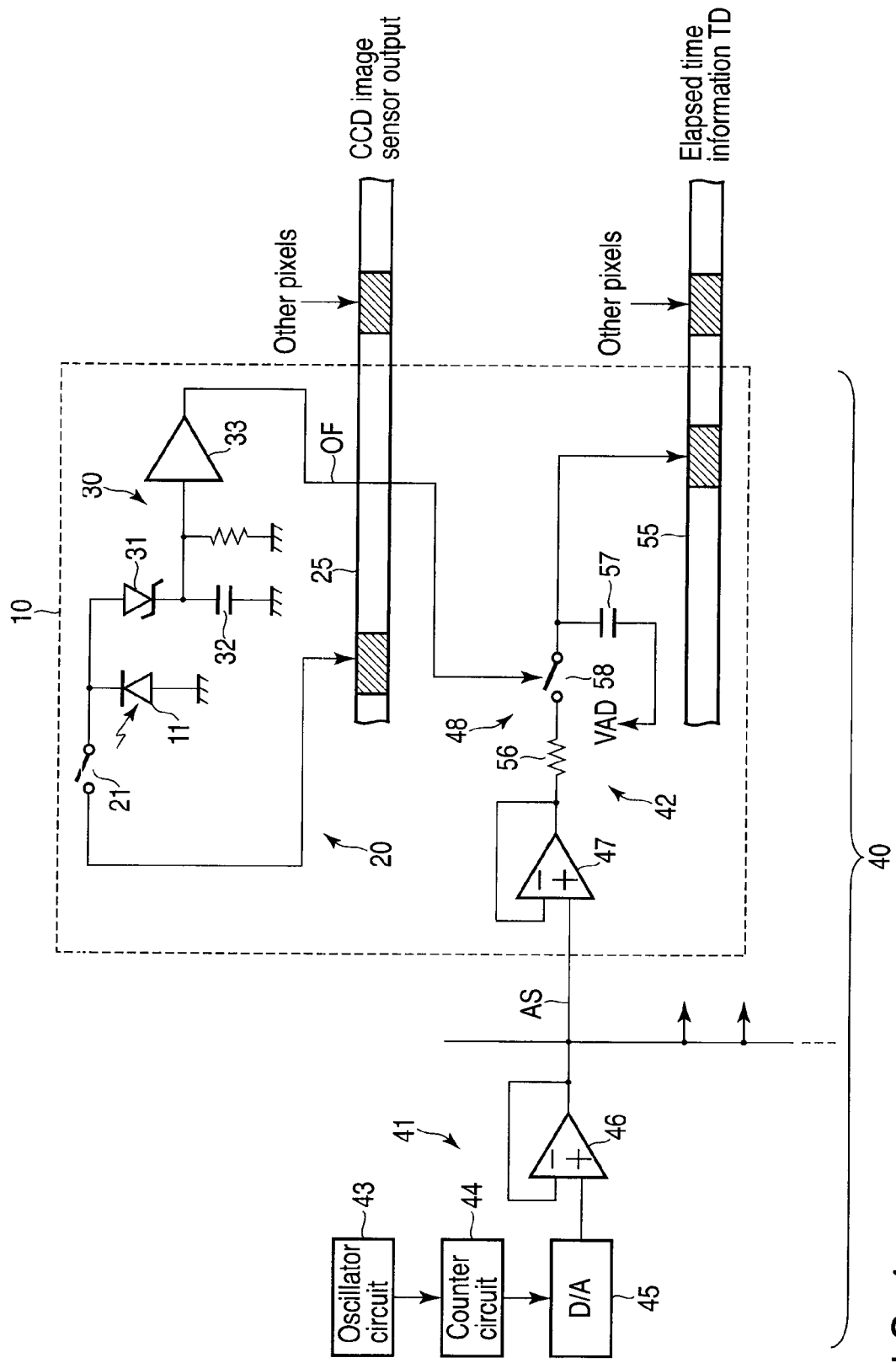
FIG. 4 is a circuit diagram showing the configuration of a CCD image sensor according to a second embodiment.

FIG. 4 is a circuit diagram of a case where a solid-state imaging device is implemented in a CCD image sensor. The CCD image sensor of this embodiment includes a pixel array in which a plurality of pixels are arranged, and control circuit. In FIG. 4, the configuration of one pixel in the pixel array, and part of the control circuit is shown. It should be noted that parts corresponding to the CMOS image sensor of the first embodiment shown in FIG. 3 are denoted by the same reference symbols as the first embodiment, and a duplicated description of them is avoided.

In the case of the CCD image sensor, it is possible to utilize charge transfer by the CCD, in which charge is shifted in an analog manner. That is, in this embodiment, a signal read section 20 is constituted of a switch element 21 connected to a photodiode 11, and vertical and horizontal CCD register 25. Further, an analog signal hold and read circuit 42 is constituted of an amplifier 47 configured to amplify an analog signal AS, sample-and-hold circuit (analog signal hold circuit) 48 configured to sample and hold an output of the amplifier 47 on the basis of an overflow flag OF, and vertical and horizontal CCD register 55 configured to read an output of the sample-and-hold circuit 48 as elapsed time information TD. In this case, the sample-and-hold circuit 48 samples and holds the output of the amplifier 47 in the state of charge, and is constituted of, for example, a resistor 56 an end of which is connected to the output node of the amplifier 47, capacitor 57 an end of which is connected to the supply node of a fixed analog voltage VAD, and which constitutes a charging circuit together with the resistor 56, and switch element 58 interposed between the resistor 56 and the other end of the capacitor 57, and conduction-controlled on the basis of the overflow flag OF.

In the CCD image sensor of this embodiment, the signal charge photoelectrically converted by the photodiode 11 is first sent to the vertical CCD register of the vertical and horizontal CCD register 25 in the state of charge through the switch element 21 in the signal read section 20, thereafter is transferred in sequence inside the vertical CCD register to be sent to the horizontal CCD register, is further transferred in sequence inside the horizontal CCD register, and is thereafter guided to the amplifier section to be converted into a voltage signal.

When an overflow flag OF is set, an analog signal AS changing in a ramp function-form is held by the sample-and-hold circuit 48. That is, when the overflow flag OF is set, the switch element 58 in the sample-and-hold circuit 48 is opened, and the charging operation of the charging circuit is stopped. When no overflow flag OF is set, a hold signal is asserted at the end of the one accumulation time, and the sample-and-hold circuit 48 is made to hold the last value of the ramp function-formed analog signal. It should be noted that it is assumed that the sample-and-hold circuit 48 can enter the sample mode without fail at the beginning of the one accumulation time. Unlike the analog signal hold and read circuit 42, an amplifier 54 is not provided, the elapsed time information TD is held in the capacitor 57 in the state of charge. The elapsed time information TD held in the capacitor 57 is, like in the case of the read to be carried out by the signal read section 20, first sent to the vertical CCD register of the vertical and horizontal CCD register 55 in the state of charge, thereafter is transferred in sequence inside the vertical CCD register to be sent to the horizontal CCD register, is further transferred in sequence inside the horizontal CCD register, and is thereafter guided to the amplifier section to be converted into a voltage signal.

It is possible to obtain the signal charge corresponding to the actual light intensity applied to the pixels by carrying out calculation of multiplying the saturation value of the signal charge read from each pixel by a multiplication factor based on the elapsed time information TD as described in connection with FIG. 1 and FIG. 2 by using the elapsed time information TD read from each pixel in the manner described above. As a result of this, according to the CCD image sensor of this embodiment, it is possible to widen the dynamic range. Furthermore, this can be realized by addition of a simple circuit.

Third Embodiment

In the solid-state imaging device of each of the first and second embodiments, an analog signal is used as a signal configured to measure the elapsed time to be supplied to each pixel. This is effective when the element arrangement space in the pixel is limited. However, when there is any redundancy in the element arrangement space in the pixel, a digital signal can also be used.

FIG. 5 is a circuit diagram of a case where a solid-state imaging device is implemented in a CMOS image sensor in which a digital signal is used as a signal configured to measure the elapsed time within one accumulation time. The CMOS image sensor of FIG. 5 shows the configuration of one pixel in a pixel array, and part of a control circuit. It should be noted that parts corresponding to the CMOS image sensor of the first embodiment shown in FIG. 3 are denoted by the same reference symbols as the first embodiment, and a duplicated description of them is avoided.

In the CMOS image sensor of FIG. 5, an elapsed time information read section 40 serving as means for measuring the elapsed time within one accumulation time of a photodiode 11 is constituted of a clock signal generation circuit 61 provided outside the pixel 10, and digital signal hold and read circuit 62 provided inside each pixel 10.

The clock signal generation circuit 61 is constituted of, for example, an oscillator circuit 63 configured to output a pulse signal of a given period, and counter circuit 64 configured to count the pulse signal output from the oscillator circuit 63, and output a clock signal CK.

The digital signal hold and read circuit 62 is configured to count the clock signal CK output from the clock signal generation circuit 61 to measure the elapsed time within one accumulation time, and hold and read a count value at the time at which an overflow flag OF is output from an overflow detection section 30 as elapsed time information TD, and is constituted of a digital signal hold circuit 64, and digital signal read circuit 65. Furthermore, the digital signal hold circuit 64 includes a gate circuit (AND gate) 66 to which the clock signal CK output from the clock signal generation circuit 61, and overflow flag OF are input, and counter circuit 67 in which an output signal of the gate circuit 66 is supplied to a clock input terminal. In the counter circuit 67, the count state thereof is reset by a reset signal RS. A count value (parallel digital signal) constituted of a plurality of bits of the counter circuit 67 is supplied to the digital signal read circuit 65. The digital signal read circuit 65 includes a shift register circuit 68 configured to convert a parallel digital signal output from the counter circuit 67 into a serial digital signal, gate circuit (AND gate) 69 to which a data output enable signal EN, and read clock signal RD are input, and which supplies a shift clock signal to a clock input terminal of the shift register circuit 68, and switch element 70 configured to read a serial digital signal output of the shift register circuit 68 as elapsed time information TD.

It should be noted that the CMOS image sensor of this embodiment is based on the premise that the image sensor is operated by global exposure achieved by electronic shutter drive as in the case of the CMOS image sensor of each of the first and second embodiments.

In the CMOS image sensor of this embodiment, when one accumulation time of the photodiode 11 is started, the clock signal CK output from the clock signal generation circuit 61 is counted in sequence by the counter circuit 67, and the count value is increased. This count value is used as a time measurement signal. It should be noted that the frequency of the clock signal CK is controlled in such a manner that the maximum value of the count value counted by the counter circuit 67 becomes the expected maximum value at the end of the one accumulation time.

When the overflow flag OF is set, the gate circuit 66 closes, supply of the clock signal CK to the counter circuit 67 stops, and the count value of the counter circuit 67 also stops. It is assumed that if no overflow flag OF is set within one accumulation time, the count value of the counter circuit 67 stops at the last value (maximum value). Thereafter, the shift clock signal is supplied to the counter circuit 67 from the gate circuit 69, whereby the count value (parallel digital signal) of the counter circuit 67 is converted into a serial digital signal by the shift register circuit 68, and is read through the switch element 70 as the elapsed time information TD. It should be noted that the count value of the counter circuit 67 is reset by a reset signal RS at the beginning of the one accumulation time.

It is possible to obtain the signal charge corresponding to the actual light intensity applied to the pixels by carrying out calculation of multiplying the saturation value of the signal charge read from each pixel by a multiplication factor based on the elapsed time information TD as described in connection with FIG. 1 and FIG. 2 by using the elapsed time information TD read from each pixel in the manner described above. As a result of this, according to the CMOS image sensor of this embodiment, it is possible to widen the dynamic range. Furthermore, this can be realized by addition of a simple circuit.

It should be note that in the CMOS image sensor of this embodiment, the case where the parallel signal which is the count value of the counter circuit 67 is read after the parallel signal is converted into a serial signal by the shift register circuit 68 has been described. However, the CMOS image sensor may be modified in such a manner that the parallel signal of the counter circuit 67 is output onto the data bus, and the elapsed time information TD of each pixel is read from the data bus without providing the shift register circuit 68.

Further, as in the case of the first embodiment, the charge overflowing the photodiode 11 may be converted into a voltage signal by means of a capacitor, and an overflow flag may be set by detecting that the voltage signal has reached a given threshold level.

Furthermore, in the CMOS image sensor of this embodiment, the case where the digital signal hold circuit 64 including the counter circuit 67 is provided in each pixel 10, and the elapsed time information TD is produced in each pixel 10 has been described. However, if the space inside the element permits, the circuit configuration may be modified in such a manner that parallel digital data is supplied as the temporal signal, and the temporal signal is latched in each pixel 10 in accordance with the overflow flag OF.

Fourth Embodiment

Figure 6:
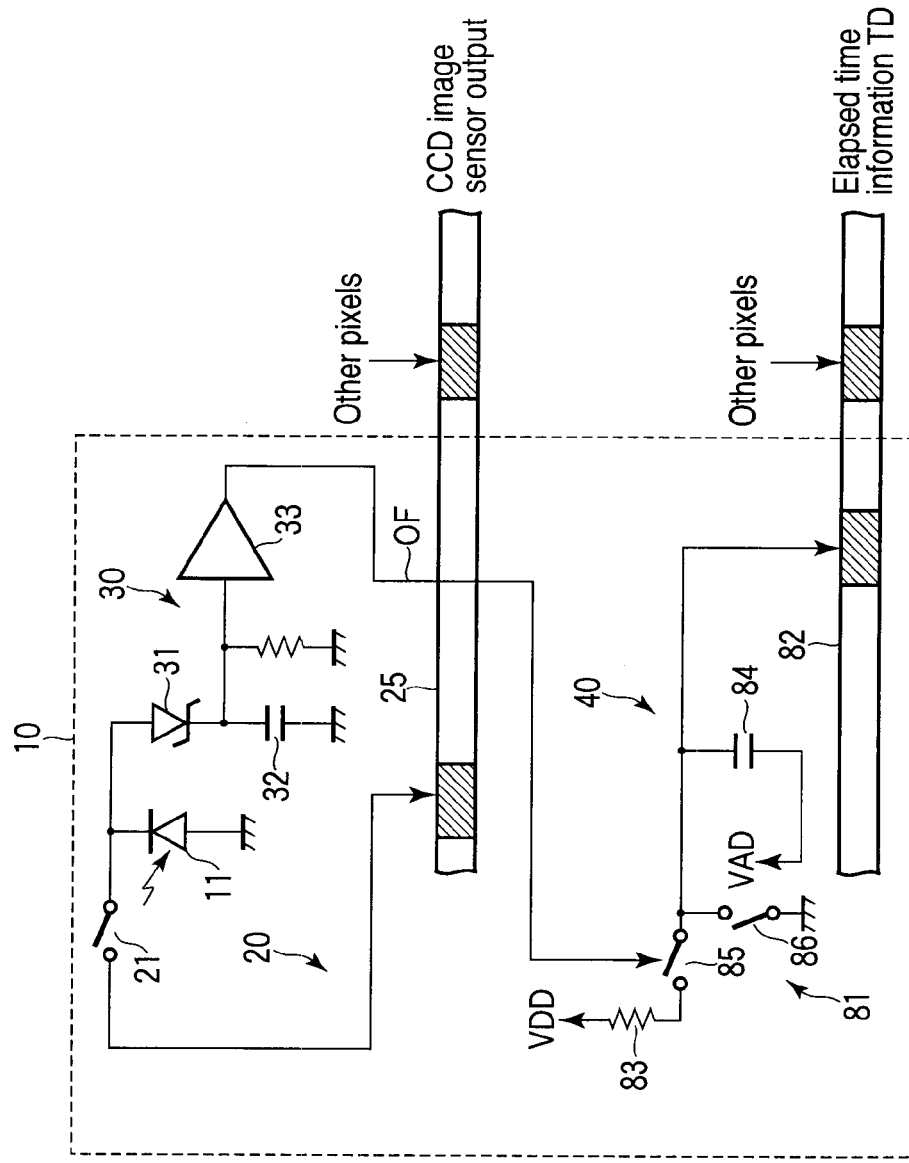
FIG. 6 is a circuit diagram showing the configuration of a CCD image sensor according to a fourth embodiment.

FIG. 6 is a circuit diagram of a case where a solid-state imaging device is implemented in a CCD image sensor. The CCD image sensor of this embodiment includes a pixel array in which a plurality of pixels are arranged, and control circuit. The CCD image sensor of FIG. 6 shows the configuration of one pixel in the pixel array, and part of the control circuit. It should be noted that parts corresponding to the CCD image sensor of the second embodiment shown in FIG. 4 are denoted by the same reference symbols as the second embodiment, and a duplicated description of them is avoided.

In the CCD image sensor of this embodiment, an elapsed time information read section 40 serving as means for measuring the elapsed time within one accumulation time of a photodiode 11 is constituted of a charge hold circuit 81 provided in each pixel 10, and configured to accumulate a given analog voltage with a given time constant, and hold the accumulated charge at the time at which an overflow is detected by an overflow detection section 30, and vertical and horizontal CCD register 82 configured to read the held charge of the charge hold circuit 81 as elapsed time information TD.

Furthermore, the charge hold circuit 81 is constituted of a resistor 83 one end of which is connected to a supply node of a power source voltage VDD, capacitor 84 one end of which is connected to a supply node of a given analog voltage VAD, and which constitutes a charging circuit together with the resistor 83, switch element 85 interposed between the resistor 83 and the other end of the capacitor 84, and conduction-controlled on the basis of an overflow flag OF, and switch element 86 for charge resetting interposed between the capacitor 84 and ground potential.

The CCD image of this embodiment is configured in such a manner that a circuit used to generate an analog signal for elapsed time measurement, and input wiring thereof are omitted. That is, a power source voltage wiring used to drive various elements inside each pixel 10 is led to each pixel 10, and the voltage of this power source voltage is utilized as a voltage employed when charging is carried out by the charging circuit (resistor 83 and capacitor 84).

At the beginning of one accumulation time, the switch element 86 is closed, whereby the charge of the capacitor 84 is reset. After cancellation of the reset, the switch element 85 is closed, and accumulation of the power source voltage VDD is started by the charging circuit. The voltage V of the capacitor 84 after the start of the charging is generally given by the following formula.

$$V = VDD(1 - \exp(-t/\tau 0)) \quad (2)$$

Where VDD is the power source voltage, $\tau 0$ is the time constant of the charging circuit, and $\tau 0 = RC$ (R is the value of the resistor 83, C is the value of the capacitor 84), and t is the elapsed time.

Before the saturation of the accumulated voltage begins, the voltage V exhibits an increase in voltage substantially proportional to the elapsed time, and the voltage increase can be utilized as a criterion of elapsed time measurement. When the charging path of the charging circuit to the capacitor 84 is intercepted by opening the switch element 85 at the time of setting of the overflow flag OF to hold the accumulated charge of the capacitor 84, the section 40 can be used as a simple sample-and-hold circuit of the analog signal. As the roughly estimated time before the beginning of the saturation, for example, it is recommendable to use a time constant of $\tau 0$ (=RC). For example, as a rough estimate for R and C that make a time constant of $\tau 0 = 1$ ms, C=100 pF, and R=10 MΩ.

The charge (elapsed time information TD) held by the capacitor 84 can be read like a pixel signal. That is, the elapsed time information TD is, as in the case of read of the CCD image sensor to be carried out by the signal read section 20, first sent to a vertical CCD register of the vertical and horizontal CCD register 82 in the state of charge, thereafter is transferred in sequence inside the vertical CCD register to be sent to a horizontal CCD register, is further transferred in sequence inside the horizontal CCD register, and is thereafter guided to an amplifier section to be converted into a voltage signal.

It is possible to obtain the signal charge corresponding to the actual light intensity applied to the pixels by carrying out calculation of multiplying the saturation value of the signal charge read from each pixel by a multiplication factor based on the elapsed time information TD as described in connection with FIG. 1 and FIG. 2 by using the elapsed time information TD read from each pixel in the manner described above. As a result of this, according to the CCD image sensor of this embodiment, it is possible to widen the dynamic range. Furthermore, this can be realized by addition of a simple circuit. Moreover, in this embodiment, it is not necessary to provide an extra circuit outside the pixel, and hence the circuit configuration can be made simpler.

Fifth Embodiment

Figure 7A:
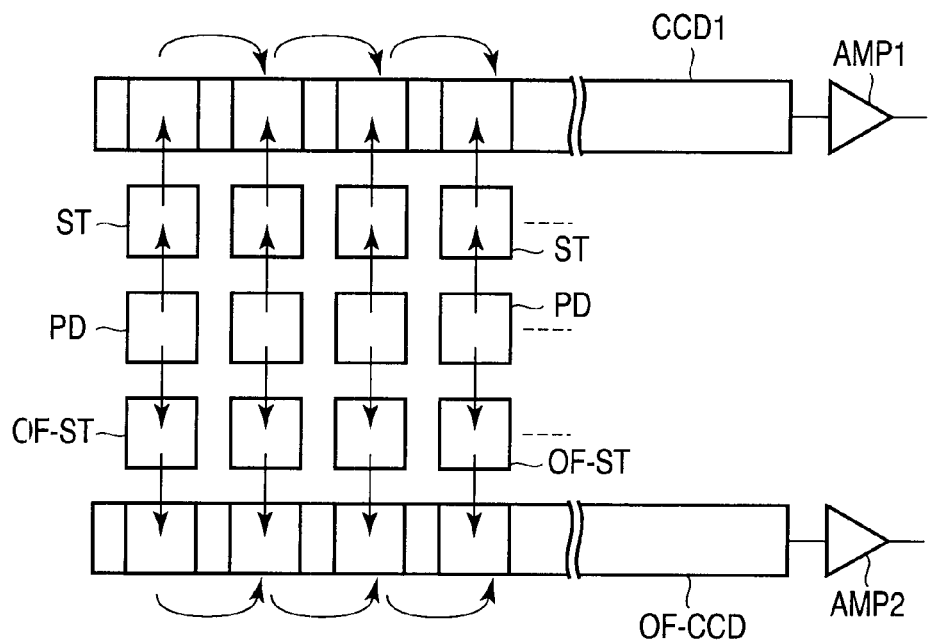
FIG. 7A and FIG. 7B are a circuit diagram showing the configuration of a CCD image sensor and potential diagram for explaining the operation according to a fifth embodiment.
Figure 7B:
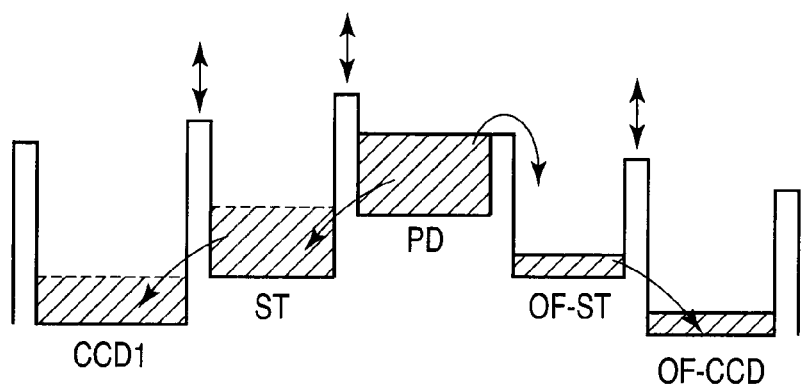

FIG. 7A is a circuit diagram of a case where a solid-state imaging device is implemented in a CCD image sensor, and FIG. 7B is a potential diagram for explaining the operation thereof. As shown in FIG. 7A, a plurality of photodiodes PD are arranged in a line. Each of the plurality of photodiodes PD constitutes a photoelectric conversion section configured to generate signal charge in accordance with the intensity of the irradiated light. Further, on one side of the arrangement of the plurality of photodiodes PD, a plurality of storage sections ST are arranged in a line parallel to the arrangement of the plurality of photodiodes PD. A CCD transfer section CCD1 is arranged parallel to the arrangement of the plurality of storage sections ST. Furthermore, on the other side of the arrangement of the plurality of photodiodes PD, a plurality of overflow storage sections OF-ST are arranged in a line parallel to the arrangement of the plurality of photodiodes PD. Further, an overflow CCD transfer section OF-CCD is arranged parallel to the arrangement of the plurality of overflow storage sections OF-ST. At a tip end part of each of the CCD transfer section CCD1 and overflow CCD transfer section OF-CCD, an amplifier section AMP1, AMP2 configured to convert electric charge into a voltage signal, and output the voltage signal is arranged.

Here, as shown in the potential diagram of FIG. 7B, signal charge generated in the plurality of photodiodes PD is transferred to the CCD transfer section CCD1 through the plurality of storage sections ST, thereafter is transferred in sequence inside the CCD transfer section CCD1, and is then converted into a voltage signal by the amplifier section AMP1. Likewise, electric charge generated in the plurality of photodiodes PD, and overflowing the photodiodes PD is transferred to the overflow CCD transfer section OF-CCD through the plurality of overflow storage sections OF-ST, thereafter is further transferred in sequence inside the overflow CCD transfer section OF-CCD, and is then converted into a voltage signal by the amplifier section AMP2.

In the image signal read carried out in the ordinary CCD system, the electric charge is transferred by the route of PD→ST→CCD1. That is, when one accumulation time (unit conversion period) is over, the signal charge accumulated in each photodiode PD is transferred to the storage section ST by lowering the potential barrier between the photodiode PD and storage section ST, and is thereafter transferred to the CCD transfer section. CCD1 by lowering the potential barrier between the storage section ST and CCD transfer section CCD1. The CCD transfer section CCD1 is normally constituted of a horizontal CCD and vertical CCD. The signal charge transferred from the storage section ST is transferred inside the horizontal CCD, thereafter is transferred to the vertical CCD, and is thereafter transferred inside the vertical CCD. It should be noted that the storage section ST is omitted in some cases.

Between each photodiode PD and each overflow storage section OF-ST, there is a given potential barrier. The signal charge that can be accumulated in the photodiode PD is determined by the height of the potential barrier. When electric charge surmounting the potential barrier is generated in the photodiode PD, the electric charge overflows the potential barrier, and is accumulated in the overflow storage section OF-ST. Thereafter, the potential barrier between the overflow storage section OF-ST and overflow CCD transfer section OF-CCD is lowered, whereby the electric charge in the overflow storage section OF-ST is transferred to the overflow CCD transfer section OF-CCD. The overflow CCD transfer section OF-CCD is also constituted of a horizontal CCD and vertical CCD. The electric charge transferred from the overflow storage section OF-ST is transferred inside the horizontal CCD, thereafter is transferred to the vertical CCD, and is further transferred inside the vertical CCD.

Here, the CCD transfer section CCD1 reads the signal charge after the expiration of the unit conversion period in the photodiode PD. Conversely, the overflow CCD transfer section OF-CCD repetitively carries out the electric-charge read operation a plurality of times during the unit conversion period in the photodiode PD. That is, the overflow CCD transfer section OF-CCD carries out the signal read at a speed higher than the one accumulation time. For example, as shown in FIG. 8A and FIG. 8B, the overflow CCD transfer section OF-CCD repetitively carries out the signal read twenty-one times within one accumulation time. That is, the above procedure is equivalent to the measurement of the elapsed time at the time of saturation with time resolution of 1/21 within one accumulation time. Although the number of times of the signal read is not limited to twenty-one, the larger the number of times of read, the higher the degree of accuracy of measurement of the elapsed time from the start of conversion to the occurrence of an overflow at the photodiode PD can be made.

It is assumed that, as shown in FIG. 8A, signal charge is accumulated in the photodiode PD with a certain gradient within one accumulation time. The saturation level shown in FIG. 8A is reached at the fourteenth scan, and after the saturation is reached, the overflowing electric charge is read from the overflow CCD transfer section OF-CCD for each scan.

FIG. 8B shows a case where the light intensity is greater than the case of FIG. 8A, and saturation occurs in the photodiode PD at a timing earlier than FIG. 8A. In the example of FIG. 8B, the saturation begins at the eighth scan, and after the start of the saturation, the overflowing electric charge is read from the overflow CCD transfer section OF-CCD for each scan as shown in FIG. 8D. Furthermore, the electric charge accumulation speed is high, and hence a signal larger than the case of FIG. 8C is read at each read time.

From the scan result of the overflow CCD transfer section OF-CCD, it is possible to detect at which period the saturation begins in the photodiode. When the saturation begins at the fourteenth section or eighth section as in the example of FIG. 8C or FIG. 8D, it is possible to obtain the signal charge corresponding to the actual light intensity applied to each photodiode PD by carrying out calculation of multiplying the saturation value of the signal charge read from each photodiode PD by a multiplication factor based on the information read from the overflow CCD transfer section OF-CCD as described in connection with FIG. 1 and FIG. 2 by using the information read from the overflow CCD transfer section OF-CCD.

That is, assuming that the light intensity obtained from the detected saturation value is 10, the actual light intensity is given by the following formula.

$$I = I0 * n'/m' \quad (3)$$

Where n' is a numerical value indicating the number of sections into which one accumulation time is divided, and m' is a numerical value indicating the ordinal number of a section at which the saturation begins.

In the example of FIG. 8C, the original output of the photodiode PD is 21/14 times the output from the CCD transfer section CCD1, and in the example of FIG. 8D, the original output of the photodiode PD is 21/8 times the output from the CCD transfer section CCD1.

It should be noted that the CCD image sensor of this embodiment provides an advantage that it is not necessary to add an amplifier for each pixel, this being particularly effective when the element arrangement space is insufficient. However, it is necessary to scan a large number of overflowing electric charges within one accumulation time, and hence the above advantage is effective when the accumulation time is relatively long, and it is possible to scan a large number of overflowing charges within the accumulation time. Accordingly, in this embodiment, the same advantage as the first to fourth embodiments can be obtained and, further this embodiment is particularly effective for the photographing such as photographing at twilight or night, photographing of the night sky or the like in which the accumulation time is long and dynamic range is wide.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A solid-state imaging device comprising:
   a photoelectric conversion section configured to generate signal charge corresponding to the intensity of irradiation light;
   a first circuit configured to read signal charge generated by the photoelectric conversion section;
   a second circuit configured to detect that the signal charge in the photoelectric conversion section has overflowed the photoelectric conversion section; and
   a third circuit configured to generate a signal corresponding to an elapsed time after the generation of the signal charge is started in the photoelectric conversion section, and hold and read the signal at a timing at which the overflow is detected by the second circuit;
   wherein the third circuit comprises
      a fourth circuit configured to output an analog signal equivalent to an elapsed time after the generation of the signal charge is started in the photoelectric conversion section; and
      a fifth circuit configured to hold the analog signal output from the fourth circuit at a timing at which an overflow of the signal charge is detected by the second circuit.

2. The device according to claim 1, wherein the photoelectric conversion section comprises a photodiode.

3. The device according to claim 1, wherein the first circuit comprises
   a first capacitor connected to the photoelectric conversion section, and configured to accumulate the signal charge generated by the photoelectric conversion section, and convert the accumulated signal charge into a voltage signal; and
   a first amplifier connected to the first capacitor, and configured to amplify the voltage signal converted by the first capacitor.

4. The device according to claim 1, wherein the second circuit comprises a second capacitor configured to accumulate the signal charge overflowing the photoelectric conversion section, and convert the accumulated signal charge into a voltage signal.

5. The device according to claim 4, wherein the second circuit further comprises a second amplifier connected to the second capacitor, and configured to amplify the voltage signal converted by the second capacitor to output an overflow flag.

6. The device according to claim 1, wherein the fourth circuit comprises
   a first counter circuit configured to count a clock signal; and
   a D/A converter configured to receive a count output of the first counter circuit, and output an analog signal corresponding to the count output.

7. The device according to claim 6, wherein the fifth circuit comprises
   a resistance element including one and an other end, and configured to receive the analog signal output from the D/A converter at the one end;
   a third capacitor which includes one end and an other end, and the one end of which is connected to a node of the reference potential;
   a switch element connected between the other end of the resistance element and the other end of the third capacitor, and made conductive at a timing at which an overflow is detected by the second circuit; and
   a third amplifier configured to receive and amplify a voltage of the other end of the third capacitor.

8. A solid-state imaging device comprising:
   a photoelectric conversion section configured to generate signal charge corresponding to the intensity of irradiation light;
   a first circuit configured to read signal charge generated by the photoelectric conversion section;
   a second circuit configured to detect that the signal charge in the photoelectric conversion section has overflowed the photoelectric conversion section; and
   a third circuit configured to generate a signal corresponding to an elapsed time after the generation of the signal charge is started in the photoelectric conversion section, and hold and read the signal at a timing at which the overflow is detected by the second circuit;
   wherein the third circuit comprises
      a second counter circuit configured to receive a clock signal, start the count of the clock signal after the generation of the signal charge is started in the photoelectric conversion section, stop the count of the clock signal at a timing at which an overflow is detected by the second circuit, and output data corresponding to the count state of the clock signal; and
      a register circuit configured to receive and store output data of the second counter circuit.

9. The device according to claim 8, wherein the photoelectric conversion section comprises a photodiode.

10. The device according to claim 8, wherein the first circuit comprises
   a first capacitor connected to the photoelectric conversion section, and configured to accumulate the signal charge generated by the photoelectric conversion section, and convert the accumulated signal charge into a voltage signal; and
   a first amplifier connected to the first capacitor, and configured to amplify the voltage signal converted by the first capacitor.

11. The device according to claim 8, wherein the second circuit comprises a second capacitor configured to accumulate the signal charge overflowing the photoelectric conversion section, and convert the accumulated signal charge into a voltage signal.

12. The device according to claim 11, wherein the second circuit further comprises a second amplifier connected to the second capacitor, and configured to amplify the voltage signal converted by the second capacitor to output an overflow flag.

* * * * *